June 2, 1942. T. D. NATHAN 2,284,761
RUBBER LINED ARTICLE AND METHOD OF MAKING THE SAME
Filed Aug. 18, 1938 2 Sheets-Sheet 1
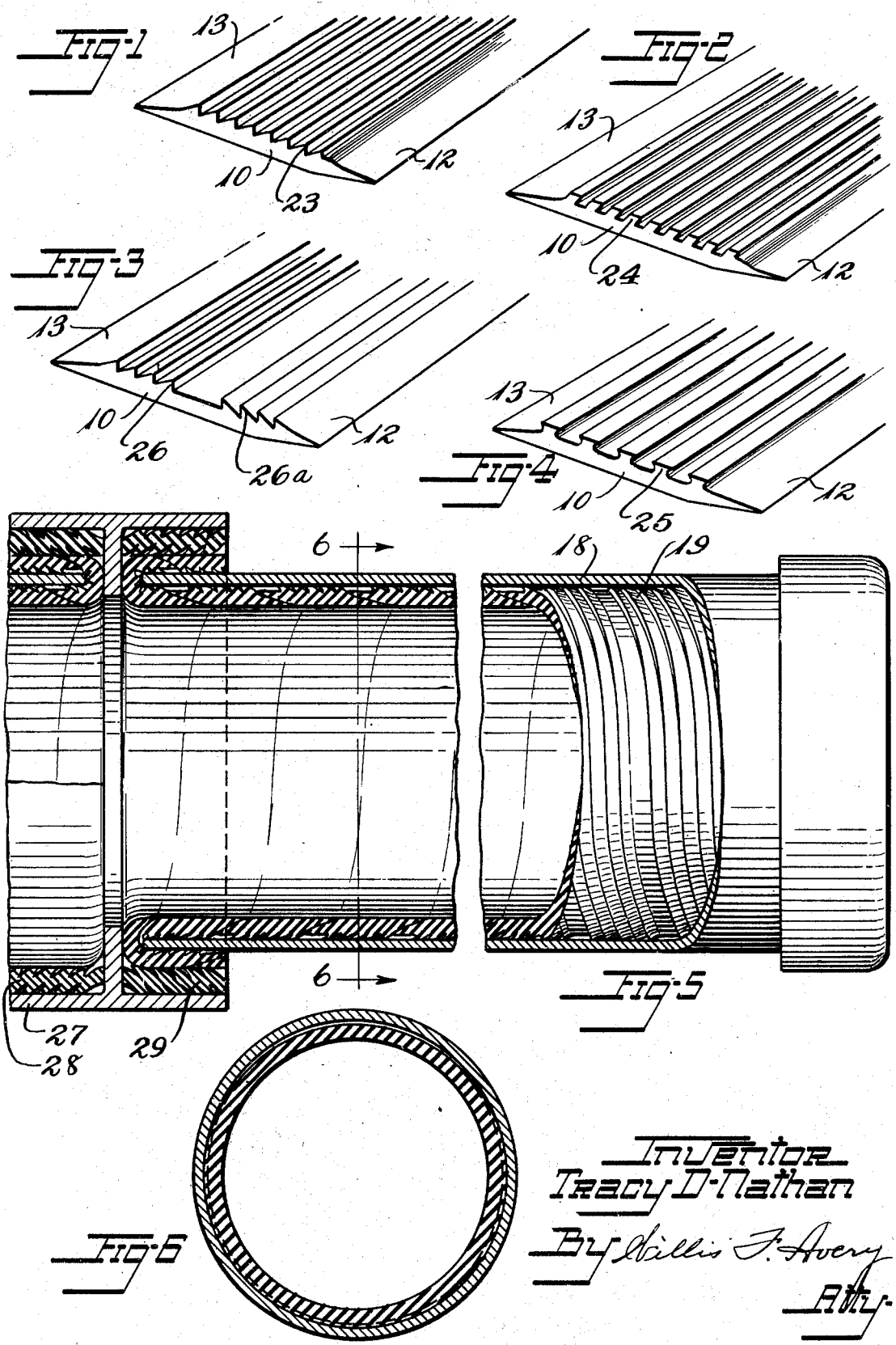

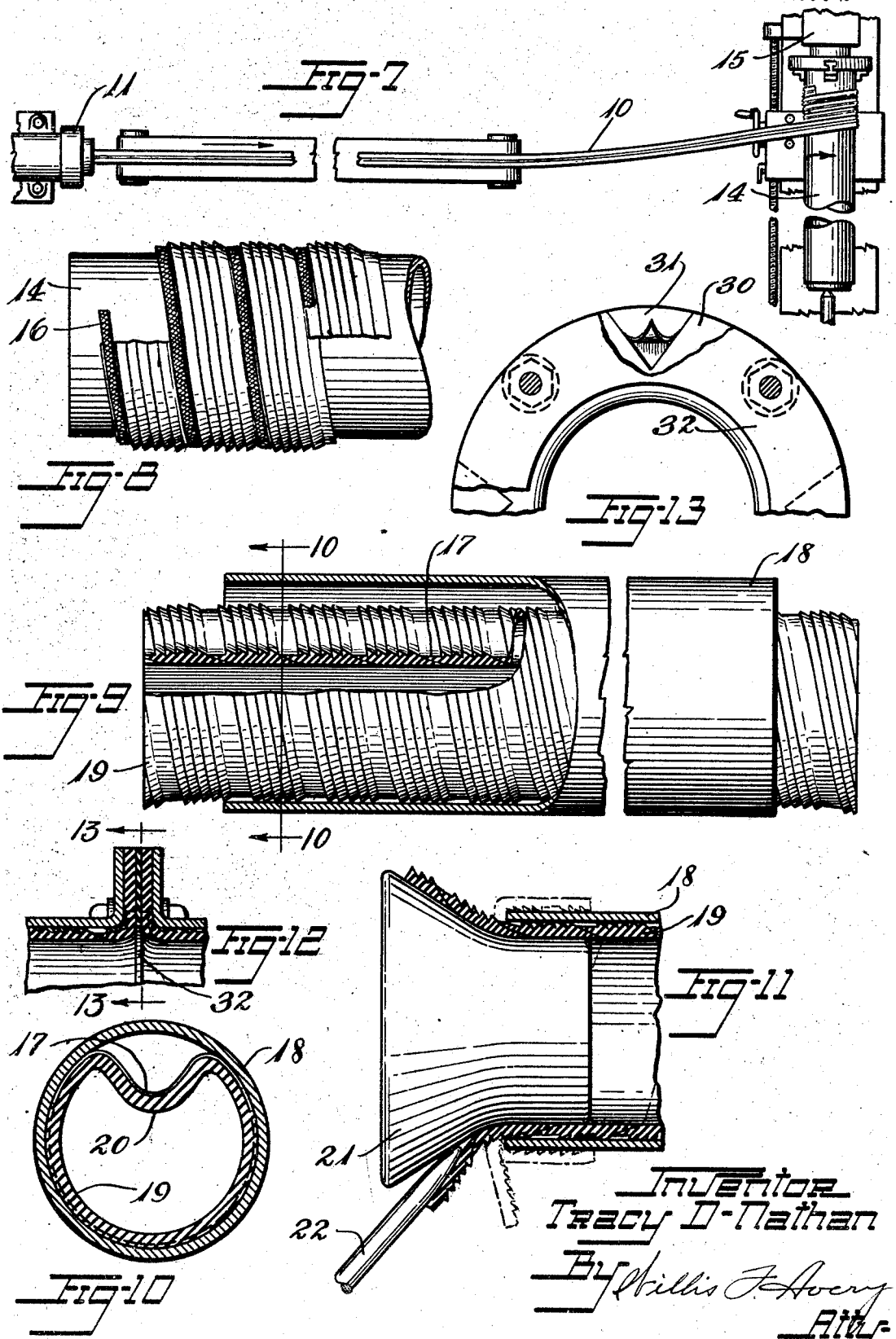

Patented June 2, 1942

2,284,761

UNITED STATES PATENT OFFICE 2,284,761

RUBBER LINED ARTICLE AND METHOD OF MAKING THE SAME

Tracy D. Nathan, Cuyahoga Falls, Ohio, assignor to The B. F. Goodrich Company, New York, N. Y., a corporation of New York Application August 18, 1938, Serial No. 225,547

9 Claims. (Cl. 29—88.2)

This invention relates to rubber lined articles and to methods of making the same and is especially useful where cylindrical pipes or other metallic bodies are to be lined with a protective lining of rubber.

Where materials which are corrosive, or which have an abrasive effect upon pipes of metal or other rigid material, are to be conducted through pipe lines or handled by other metallic apparatus, it has been proposed to line the pipes or other apparatus with a soft vulcanized rubber lining in sheet form which is more resistant to abrasion and to corrosion. Such a lining however involves considerable expense. Due to the forces exerted upon such a lining by the flow of material therethrough and the collapsing tendency caused by the development of local areas of low pressure sometimes well approaching a vacuum, it has been necessary to secure the rubber lining to the metal by a bond of great strength. This has been difficult to accomplish even when new metal pipe is used and the linings are installed in the pipe sections at the factory of the manufacturer. The difficulty has been aggravated where the pipe is old or has been previously used, so that it is rusted, pitted or coated with scale on its inner surface, due to the difficulty of preparing the metal surface for a successful bond to the rubber. Even where it was possible to bond the rubber to the pipe, the expense involved would not warrant the use of the old pipe.

The present invention contemplates the installation of vulcanized rubber linings in a state of compression to resist collapse due to vacuum conditions in the pipe, to resist movement of the lining along the pipe by an automatic increase in lining compression under tendency to flow, and to provide increased resistance to abrasion so as to provide for the handling of slag and other sharp materials.

The principal objects of this invention are to make unnecessary the use of adhesives for securing the lining, to provide economy in the manufacture of the lining, to provide for insertion of the lining under compression, to provide resistance to creep of the lining, to provide for securing the ends of the lining, and to provide resistance to corrosion and abrasion.

These and other objects will appear from the following description and the accompanying drawings.

Of the drawings:

Fig. 1 is a perspective view of a strip of rubber material for forming the lining.

Fig. 2 is a similar view of a modification thereof.

Fig. 3 is a similar view showing a further modified form of strip.

Fig. 4 is a similar view showing a further modification.

Fig. 5 is a side view of a pipe section with a portion of an adjoining section and a coupling therefor, showing the use of the lining, parts being broken away and parts shown in section.

Fig. 6 is a cross section thereof, taken on line 6—6 of Fig. 5.

Fig. 7 is a plan view showing the manufacture of the strip material and winding thereof to form the lining, parts being broken away.

Fig. 8 is an enlarged view of part of the mandrel with the lining thereon.

Fig. 9 is an elevation showing the insertion of the lining in a pipe, parts being broken away and parts shown in section.

Fig. 10 is a cross-section thereof taken on line 10—10 of Fig. 9.

Fig. 11 is an elevation, partly in section, showing the cuffing of the ends of the lining tube.

Fig. 12 is a sectional view of a flange coupling, showing how the lining may be utilized as a gasket.

Fig. 13 is a face view of one of the lined flanges, taken on line 13—13 of Fig. 12.

Referring to the drawings, the invention contemplates in its preferred form the forming of the lining from a strip 10 of rubber-like material which may be formed progressively, as by extruding a rubber composition by use of an extruding machine 11 (see Fig. 7) calender, or other plastic forming apparatus to form a strip such as those illustrated in Figs. 1 to 4, inclusive. These strips have cooperating margins, such as the beveled margins 12, 13 shown, which may be interlocked or overlapped to form a continuous lining by uniting the margins of a helically wound strip. As shown in Fig. 7 and Fig. 8, the strip is preferably wound helically on a mandrel 14 in a lathe 15 or other driving instrumentality.

Where the plastic strip is wound upon itself directly from the extruding or other forming machine, and while the rubber is hot and no dust has been permitted to accumulate upon its surface, the margins of the successive convolutions become intimately attached and bonded to each other. Pressure may be applied over the overlapping portions, as by a roller or by temporarily binding the overlapped margin to the mandrel by means of a tape 16 of fabric wound thereupon. The mandrel 14 is of such size with relation to the size of the article to be lined as to provide a lining exceeding in external circumference the internal circumference of the cylinder to be lined.

The assembled lining is vulcanized while on the mandrel, in any desired manner, as by placing the mandrel with the lining thereon within an open steam vulcanizer or a dry air vulcanizing oven and subjecting it to an elevated temperature. The tape 16 is then removed.

After vulcanization, the cylindrical lining is inserted in the pipe or other article and forced into place. In order to accomplish this, the cylindrical lining is collapsed inwardly to reduce its diameter temporarily as at 17 in Figs. 9 and 10. Here the pipe 18 has the lining 19 inserted therethrough and by pressure at the position 20 directed toward the wall of the pipes the lining may be sprung into place, where due to its arched shape and its being under compression it retains its position indefinitely.

The ends of the lining are permitted to extend beyond the ends of the pipe before the lining is forced into place to provide for cuffing back over the pipe or to cover the flanges where pipe flanges are present. Where the lining is to be cuffed back over the pipe as in Fig. 5, a cone shaped block 21, (see Fig. 11) may be forced into the end of the lining to prevent slipping of the lining with relation to the pipe and to keep the lining from bulging away from the pipe near the bend around the edge of the pipe. A bar 22 may then be used to raise the free portion of the lining and to force it back over the margin of the pipe where it retains itself resiliently. A wire or other holding means may be used if desired to hold the cuffed portion over the pipe, although this is not always necessary and is only temporary until the covering is secured by couplings or other means.

In the preferred form of the invention, the outer surface of the strip material comprising the lining is formed with longitudinally disposed ridges and grooves, as in Figs. 1 to 4 wherein different arrangements of ribs are illustrated. These ribs have a number of important functions. They provide a compressible cushion layer between the non-compressible portion of the lining and the wall of the pipe. It has been found where certain rubber compositions are subjected to the action of aqueous solutions under pressure, that the rubber, although it does not permit leakage, absorbs a certain quantity of the fluid causing expansion of the rubber. Where the rubber is used to line a receptacle, such absorption appears to have the greatest effect, as the expansion of the rubber, at the surface of the rubber adjacent the pipe wall and farthest away from the fluid. Such action would tend to place the outer strata of the lining under greater compression than the inner strata setting up forces tending to buckle the lining away from the pipe. The grooves in applicant's lining compensate for any swelling of the outer strata of the lining and prevent the setting up of objectionable buckling forces.

Then as applicant's method of placing the lining contemplates circumferential compression of the lining, the ribbed and grooved outer surface localizes the compression to the portion near the fluid-contacting face, thereby distributing the force in such a way as to cause the lining to be urged in contact with the pipe. The ribs also compensate for any irregularities in the diameter of the pipe, as the grooves permit distortion of the ribs to the extent of filling the grooves. The grooves permit the exit of air and prevent the trapping thereof between the lining and the pipe wall. As the ribs in the finished lining are located substantially circumferentially of the pipe they not only provide a plurality of wall engaging ridges which may cooperate with any irregularities of the pipe wall in resisting movement of the lining axially of the pipe, but where the ribs 23 (see Fig. 1) are of saw tooth shape so as to have one face substantially vertical and the other sloped, or where the ribs are actually tipped forward as the ribs 24 of Fig. 2 or have undercut faces as the ribs 25 of Fig. 4 any tendency to move the lining axially of the pipe would cause the ribs to act as moving struts tending to compress the lining even more and increasing its resistance to such axial movement. Where the lining is made in narrow strips helically wound, the ribs of any desired shape may readily be formed during the forming of the strip and the ribs may be so numerous that their combined effect in resisting axial movement far overcomes any force tending to promote such movement. Where flow through the pipe is in one direction, the forms of ribs of Figs. 1 and 2 are preferred, but where flow is liable to be reversed, so that forces are developed acting axially in either direction, the form shown in Fig. 3 is to be preferred because of the ribs 26 adapted to resist movement in one direction, and the ribs 26a adapted to resist movement in the opposite direction.

Similar pipe sections lined as herein described, with the lining cuffed back thereover may be readily coupled as shown in Fig. 5, by providing a sleeve 27 of T cross-section and employing a pair of joint sealing rings 28, 29 having circumferentially extending flanges at the inner and outer surfaces thereof to engage the rubber covering cuffed over the pipe and the sleeve member respectively so as to act respectively as lip-sealing members and pawls as more fully disclosed in my Patent No. 2,032,492 of March 3, 1936, entitled "Pipe joint assembly." This construction permits the use of pipe which is neither threaded nor flanged.

Where it is desired to use flanged pipe, the lining may simply be turned out over the face of the flanges, as at 30 in Fig. 13, where it serves as a gasket between the flanges. Where the lining is heavy and only slightly extensible gores may be cut from the lining over the flange and inserts 31 may be cemented in place to provide a continuous flange. Where desired an additional gasket 32 may be used between the flanges as shown in Figs. 12 and 13.

The production of the lining material in strip form greatly reduces the cost of manufacture and enables the production of linings for different sizes of pipe from the same strip, merely requiring the use of mandrels of different sizes. Alteration in the rib construction may also be made quickly and with only a small expenditure of time and money, many changes being possible merely by adjustment of the die of the extruding machine. The winding of the strip directly from the extruding machine insures a permanent and secure bond between the successive convolutions of the strip while the material is still warm and plastic and before dust or bloom has collected or formed on the surface of the strip or prevulcanization has taken place. The building of the lining about a mandrel insures pressure being applied at every point along the joined margins of the strips due to the curvature of the mandrel and the pressure of the wrapping tape.

The process adapts itself to the production of lining sections of slightly different size in successive sections by mere change of mandrels as may be necessitated by utilization of old pipe. Due to the lack of necessity of a bond between the pipe wall and the lining, such old pipe as is at hand may be used or old pipe lines may be lined with new material. It is found, however, that where a lining is held against another surface for a long time a bond develops between the rubber and the adjoining surface, and this would no doubt form a bond between the pipe wall and the lining when the lining is installed under initial circumferential compression and the pipe was constantly under pressure in use, especially where warm material was conducted therethrough. The circumferentially compressed condition of the lining affords great resistance to abrasion, making the lined pipe very useful in the distribution of liquids containing solids such as sand or granulated slag.

These and other embodiments may be made without departing from the invention as defined by the following claims.

I claim:

1. A lining for a hollow body having a chamber therein, said lining comprising a tubular body of pliable resilient rubber-like material adapted to be flexed inwardly to provide a buckled portion thereby to reduce its outer dimension for insertion into a chamber of smaller size than the lining, said lining being adapted by outward flexing of said buckled portion to engage the wall of said chamber under circumferential compression of the lining, and said lining having a plurality of outwardly projecting portions of the resilient rubber-like material integral with said lining at its outer surface to press against the wall of the chamber as a result of the circumferential compression of the lining and resiliently cushioning said lining from said wall.

2. A lined article comprising a hollow body having a chamber therein, a lining of larger diameter in its unstressed state than said chamber, said lining comprising a tubular body of pliable resilient rubber-like material adapted to be flexed inwardly to provide a buckled portion thereby to reduce its outer dimension for insertion into said chamber, said lining engaging the wall of said chamber under circumferential compression by virtue of the outward flexing of said buckled portion to an unbuckled state of the lining, said lining having a plurality of outwardly projecting portions of the resilient rubber-like material integral with said lining at its outer surface pressing against the wall of the chamber as a result of the circumferential compression of the lining and resiliently cushioning said lining from the said wall, and said projecting portions comprising ribs of the rubber-like material integral with said tubular body.

3. A lining for a hollow body having a chamber therein, said lining comprising a tubular body of pliable resilient rubber-like material adapted to be flexed inwardly to provide a buckled portion thereby to reduce its outer dimension for insertion into a chamber of smaller size than the lining, said lining being adapted by outward flexing of said buckled portion to engage the wall of said chamber under circumferential compression of the lining, said lining having a plurality of outwardly projecting portions of the resilient rubber-like material integral with said lining at its outer surface to press against the wall of the chamber as a result of the circumferential compression of the lining and resiliently cushioning said lining from said wall, and said projecting portions comprising helical ribs of the rubber-like material extending from end to end of said tubular body and being integral therewith.

4. A lined article comprising a hollow body having a chamber therein, a lining of larger diameter in its unstressed state than said chamber, said lining comprising a tubular body of pliable resilient rubber-like material adapted to be flexed inwardly to provide a buckled portion thereby to reduce its outer dimension for insertion into said chamber, said lining engaging the wall of said chamber under circumferential compression of the lining by virtue of the outward flexing of said buckled portion to an unbuckled state, said lining having a plurality of outwardly projecting portions of the resilient rubber-like material integral with said lining at its outer surface pressing against the wall of the chamber as a result of the circumferential compression of the lining and resiliently cushioning said lining from said wall, and said projecting portions being radially inclined in an axial direction of the tubular body to resist movement of the lining axially of said chamber by pawl-like action of the projecting portions against said wall.

5. A lining for a hollow body having a chamber therein, said lining comprising a tubular body of pliable resilient rubber-like material adapted to be flexed inwardly to provide a buckled portion thereby to reduce its outer dimension for insertion into a chamber of smaller size than the lining, said lining being adapted by outward flexing of said buckled portion to engage the wall of said chamber under circumferential compression of the lining, said lining having a plurality of outwardly projecting portions of the resilient rubber-like material integral with said lining at its outer surface to press against the wall of the chamber as a result of the circumferential compression of the lining and resiliently cushioning said lining from said wall, said projecting portions comprising ribs radially inclined in an axial direction of the tubular body to resist movement of said lining axially of said chamber when in place therein by pawl-like action of the projecting portions against said wall.

6. A lining for a hollow body having a chamber therein, said lining comprising a tubular body of pliable resilient rubber-like material in strip form coiled in helical convolutions adhered to each other in edge-to-edge relation and adapted to be flexed inwardly to provide a buckled portion thereby to reduce its outer dimension for insertion into a chamber of smaller size than the lining, said lining being adapted by outward flexing of said buckled portion to engage the wall of said chamber under circumferential compression of the lining, and said lining having a plurality of outwardly projecting portions of the resilient rubber-like material integral with said lining at its outer surface to press against the wall of the chamber as a result of the circumferential compression of the lining and resiliently cushioning said lining from said wall.

7. A lining for a hollow body having a chamber therein, said lining comprising a tubular body of pliable resilient rubber-like material in strip form having at least one longitudinal rib on one face thereof and coiled in helical convolutions adhered to each other in edge-to-edge relation with said rib on the convex surface thereof, the lining being adapted to be flexed inwardly to provide a buckled portion thereby to reduce its outer dimension for insertion into a chamber of smaller size than said body, said lining being adapted by outward flexing of said buckled portion to engage the wall of said chamber under circumferential compression of the lining and said rib being adapted to press against the wall of the chamber and resiliently cushioning said lining from said wall.

8. The method of lining a hollow body having a chamber therein which comprises forming the lining as a tubular body larger in diameter than the chamber of resilient rubber-like material with projections on its outer surface integral therewith buckling a longitudinal portion of said tubular body inwardly thereof to reduce its outer dimension, inserting said tubular body within said chamber, and restoring the buckled portion to its unbuckled shape to press said projections into contact with the surface of said chamber by virtue of the circumferential compression in the lining resulting from its crowded fit in the chamber.

9. The method of lining a hollow body having a chamber which comprises forming the lining as a tubular body larger in diameter than the chamber and longer than the same of resilient rubber-like material with projections on its outer surface integral therewith, buckling a longitudinal portion of said tubular body inwardly thereof to reduce its outer dimension, inserting said tubular body within said chamber, restoring the buckled portion to its unbuckled shape to press said projections into contact with the surface of said chamber by virtue of the circumferential compression in the lining resulting from its crowded fit in the chamber, and cuffing projecting ends of said tubular body over ends of said hollow body to hold said tubular body in place.

TRACY D. NATHAN.